April 23, 1929.   C. W. LEGUILLON   1,709,942
TUBE STRIPPING METHOD AND APPARATUS
Filed June 29, 1925   2 Sheets-Sheet 1
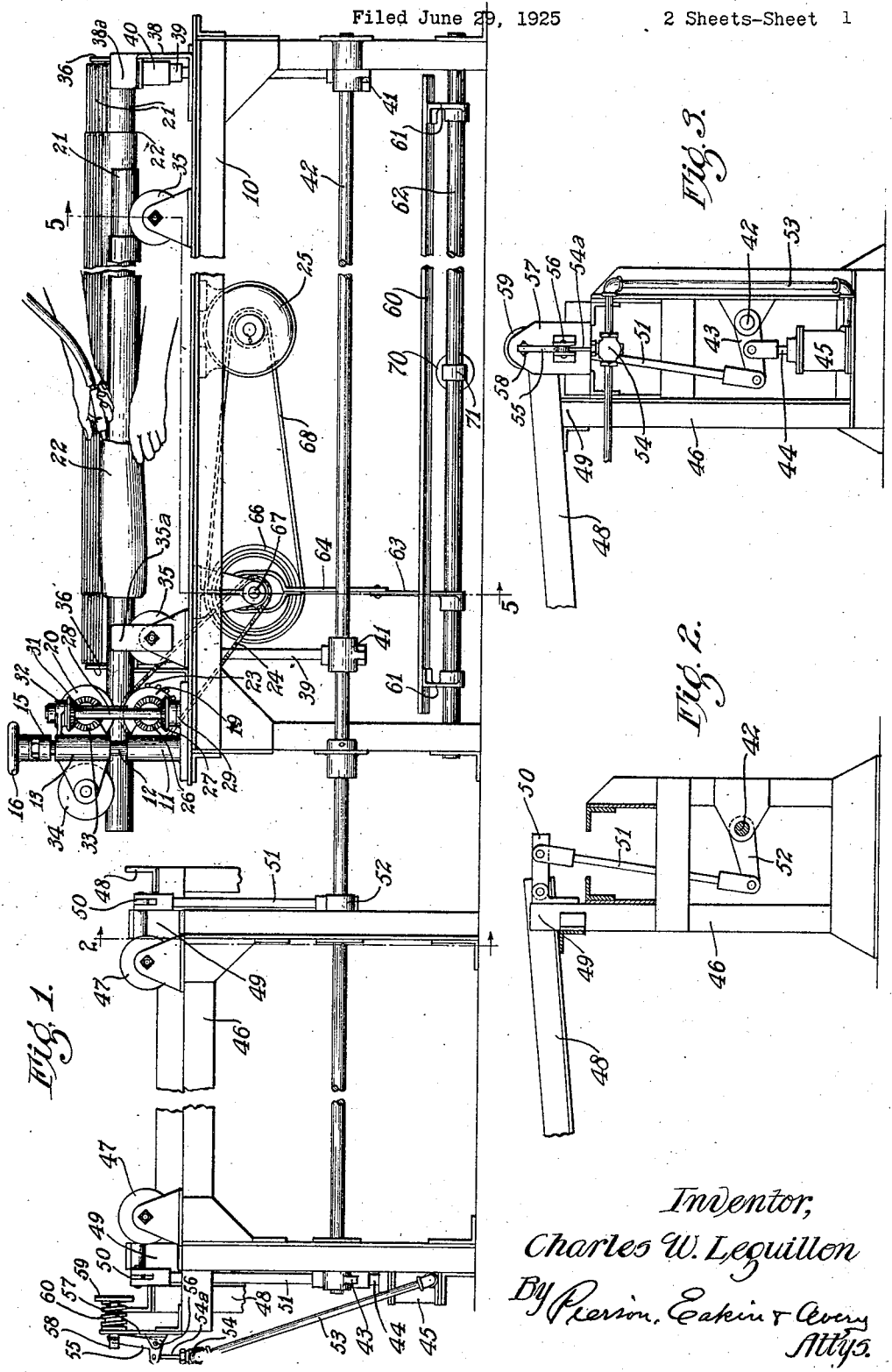
Inventor,
Charles W. Leguillon
By Pierson, Eakin & Avery
Attys.

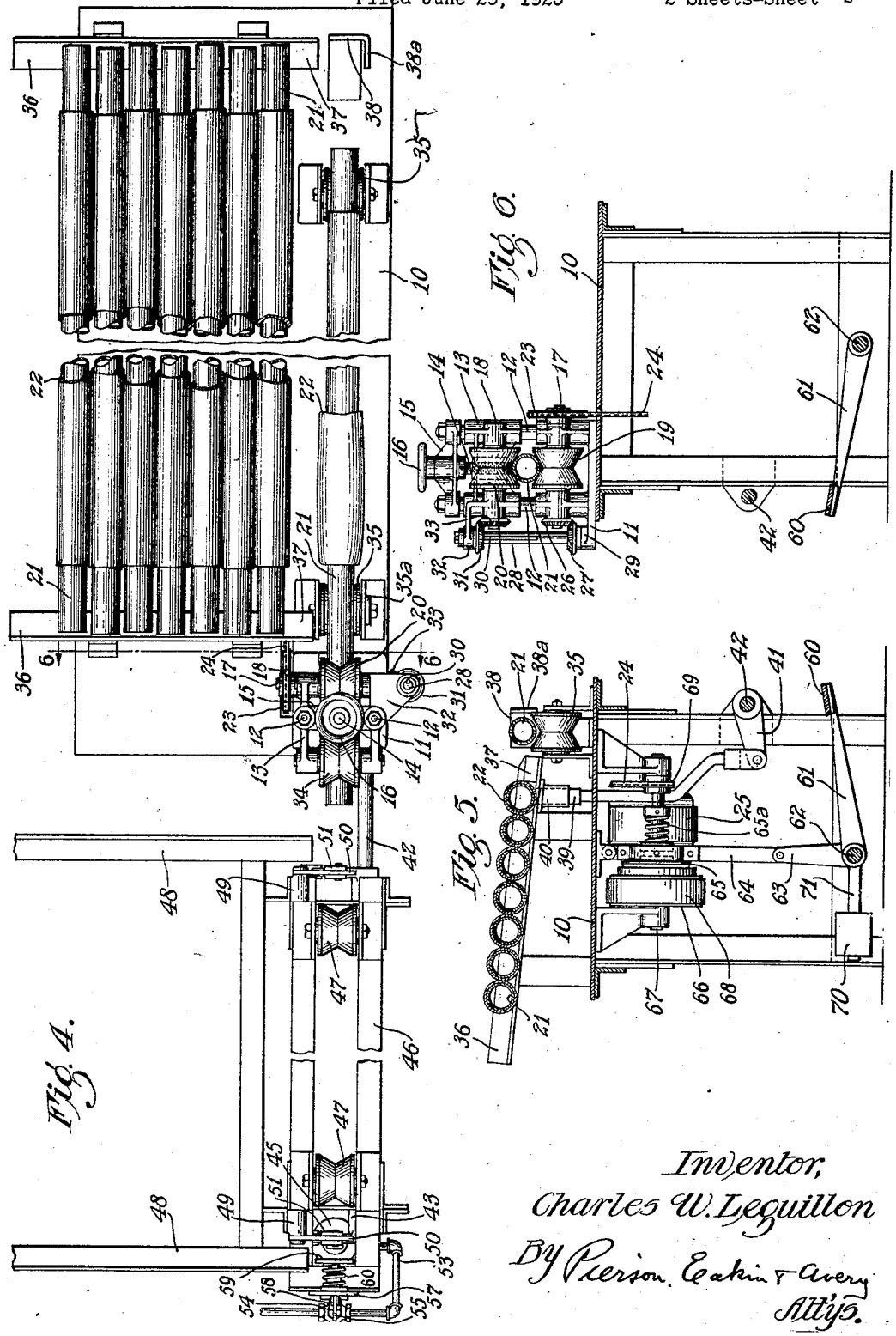

Patented Apr. 23, 1929.

1,709,942

UNITED STATES PATENT OFFICE.

CHARLES W. LEGUILLON, OF AKRON, OHIO, ASSIGNOR TO THE B. F. GOODRICH COMPANY, OF NEW YORK, N. Y., A CORPORATION OF NEW YORK.

TUBE-STRIPPING METHOD AND APPARATUS.

Application filed June 29, 1925. Serial No. 40,412.

This invention relates to the art of manufacturing rubber tubes, and especially to removing from mandrels upon which they are vulcanized rubber tubes adapted to have their ends joined to form inner tubes for pneumatic tires.

In this operation the common practice heretofore has been to mount the mandrel with the vulcanized tube thereon by securing one end of the mandrel in a suitable support adapted to hold the same in a substantially horizontal position without other supporting means, and then to turn back the end of the tube adjacent the support to form a cuff and insert the nozzle of a compressed-air hose under the turned back cuff, the operator walking backward beyond the free end of the mandrel, withdrawing the tube from the latter wrong side out while inflating the turned portion of the tube by means of the air nozzle.

My chief objects are to provide improved procedure and apparatus for stripping tubes whereby the manual operations may be reduced in number and rendered less laborious as compared with prior practice. More specific objects will become manifest hereinafter.

Of the accompanying drawings:

Fig. 1 is a side elevation of apparatus embodying and adapted to carry out my invention in its preferred form with the work in place, parts being broken away.

Fig. 2 is a vertical section on line 2—2 of Fig. 1.

Fig. 3 is an end elevation of the apparatus as viewed from the left of Fig. 1.

Fig. 4 is a plan view of the structure shown in Fig. 1, parts being broken away.

Fig. 5 is a section on line 5—5 of Fig. 1.

Fig. 6 is a section on line 6—6 of Fig. 4.

Referring to the drawings, 10 is a table upon one end of which is mounted a stationary bracket 11, and rising from the latter are a pair of vertical guide-posts 12, 12 having slidably mounted thereon an adjustable bracket 13, the latter being adapted to be vertically adjusted by means of a screw 14 which is threaded into its medial portion and rotatably and non-slidably mounted in a cross-beam 15 secured to the upper ends of the guide-posts 12, said screw being provided above the cross-beam with a hand wheel 16.

Journaled in the brackets 11, 13 at the work receiving side thereof are parallel driven shafts 17, 18 upon which are mounted vertically aligned, grooved, soft surfaced feed rollers 19 and 20 respectively, the same being adapted to impel between them a tube-forming mandrel 21 upon which an elastic tube 22 has been built and vulcanized, the shaft 17 being provided at one end with a sprocket 23 connected by a sprocket chain 24 with a motor 25 mounted beneath the table 10, and the other end of the shaft 17 being provided with a bevel gear 26 meshed with a similar gear 27 keyed to a vertical shaft 28 which has its lower end mounted in a journal 29 formed on the bracket 11. Slidably keyed on the shaft 28 near its upper end by a key 30, is a bevel gear 31 having its hub non-slidably journaled in a lateral extension 32 of the bracket 13, the gear 31 being meshed with a bevel gear 33 mounted on the adjacent end of the roller-shaft 18, the gearing being such as to drive the feed rollers 19, 20 to impel the mandrel.

A roller 34 of the same construction as the feed rollers 19, 20 is loosely journaled in horizontal alignment with the latter roller in arms formed on the work-delivery side of the adjustable bracket 13, said roller 34 being adapted to engage the leading end of the mandrel 21 as the latter emerges from between the feed-rollers 19, 20 and raise the trailing end of the mandrel clear of grooved positioning rollers 35, 35 mounted in suitable brackets at opposite ends of the table 10 and adapted to receive the mandrel and guide it into the feed rollers.

Mounted transversely upon the table 10 at each of its ends is an inclined flanged rail 36, said rails comprising a chute adapted to support a plurality of the mandrels 21 with tubes thereon by engagement with their end portions. Each flanged rail is provided with an abutment or stop 37 at its lower end, the stops having their upper faces so formed and positioned that successive mandrels lifted thereonto will roll by gravity into the grooves of the rollers 35. An abutment 38 is mounted upon the table 10 in alignment with the rollers 35 and to the right of the same to prevent axial movement of the mandrel rearwardly therein during the initial stage of the stripping operation, said abutment being formed with an ear 38$^a$ opposite the end of the adjacent rail 36 for preventing the end of said mandrel from bouncing from the adjacent roller 35 after dropping thereon. A stop 35ª extending upward on the near side of the journal bracket of the other roller 35 serves the same purpose for the other end of the mandrel.

For lifting successive mandrels above the chute-abutments 37 and causing them to roll thereonto vertically movable lift rods 39, 39 have enlarged upper end portions which are slidably mounted in respective bushings 40 on the under faces of the rails 36, and the lower ends of the rods are connected to the free ends of respective rock arms 41, 41 mounted upon a rock-shaft 42 journaled in the framing of the table 10 and in the framing of a mandrel-ejecting device which is positioned adjacent the work-delivery end of the stripping table 10, one end of the rock-shaft 42 being provided with a lever 43 to which the piston rod 44 of a fluid pressure actuated cylinder 45 is connected at an intermediate point (see Figs. 1 and 3). The work engaging top faces of the lift rods 39 are beveled (see Fig. 5) so that the mandrel lifted thereby is caused to roll forward over the abutments 37.

The mandrel-ejecting device comprises a frame 46 upon which are journaled grooved rollers 47, 47 at substantially the same elevation as that of the feed-roller 19, said rollers 47 being adapted to receive a mandrel 21 as the same is delivered from the feed-rollers 19, 20. Extending laterally and downwardly from the frame 46 are a pair of flanged rails 48, 48 constituting a chute for receiving the stripped mandrels, the upper ends of said rails being positioned adjacent to and substantially on a level with the tops of the rollers 47 at each end of the device.

For raising successive mandrels from the grooved rollers 47 and permitting them to roll onto the rails 48, there are provided at each end of the frame 46 upstanding brackets 49, 49 to which are pivoted respective levers 50, 50 extending transversely of the frame and normally positioned below the level of a mandrel resting on the rollers 47. The levers 50 are connected respectively by downwardly extending links 51, 51 to the end of the lever 43 hereinbefore describd and to a similar lever 52 secured to the rock-shaft 42 at the opposite end of the frame. The fluid pressure cylinder 45 is thus adapted at one operation to eject a stripped mandrel from this device and to deposit a mandrel with a tube thereon upon the rollers 35 of the tube-stripping device.

A pipe 53 for charging the cylinder connects therewith through a plunger-actuated three-way valve 54 adapted to charge and exhaust the cylinder when the plunger 54ª, is depressed and raised, respectively. Said plunger is connected to one arm of a bell-crank lever 55 (see Fig. 1), said lever being fulcrumed at 56 on an upstanding bracket 57 secured to the end of the frame 46, the other arm of said said bell-crank lever fitting within and being pivotally connected to the slotted end of a push-rod 58, which extends through the upper portion of the bracket 57 and has its free end provided with a buffer-plate 59. The latter is so positioned as to be in alignment with the mandrel 21 as the latter rests upon the rollers 47, and is adapted to be struck by the mandrel to depress the valve plunger and charge the cylinder 45. A compression spring 60 mounted on the push-rod 58 between the bracket 57 and buffer plate 59 is provided for restoring the push rod to normal position after the mandrel has been ejected from the rollers 47, and for raising the valve plunger to exhaust the cylinder 45.

A foot-board 60 extends along the front of the table 10 being mounted upon the ends of levers 61 secured to and extending forwardly from a rock-shaft 62. A lever 63 extending upward from the said rock-shaft is connected to the lower end of a shipper-lever 64 adapted to shift one member 65 of a cone clutch, the other member of said clutch being secured to a pulley 66 loosely mounted on a countershaft 67, and adapted to be driven by a belt 68 from the motor 25 (see Fig. 5). The cone member 65 is slidably keyed to the countershaft 67 and backed by a spring 65ª, and the countershaft 67 has secured thereon a sprocket 69 meshed in the sprocket-chain 24. A counter-weight 70 mounted on a lever 71 extending rearwardly from the rock-shaft 62 is provided for holding the foot-board 60 normally raised and the clutch members normally engaged to drive the feed rollers 19, 20.

In the operation of the apparatus, the motor 25 being driven and the delivery chute comprising the rails 36 having previously been filled with the mandrels 21 with vulcanized tubes 22 thereon, and a mandrel being in stripping position upon the positioning rollers 35, the operator turns back the tube end at the left or leading end of the mandrel to form a cuff, inserts the nozzle of a compressed fluid line thereunder, as shown in Fig. 1, and draws said tube end toward the right or trailing end of the mandrel, the compressed fluid holding the turned back portion of the cuff off the underlying unstripped portion of the tube, the leading end of the tube 22, as the mandrel is received upon the rollers 35, being clear of the adjacent roller 35 so that the latter does not interfere with the stripping operation, and the mandrel being held against axial recession by the abutment 38.

The operator then pushes the mandrel forward so that its leading end is engaged by the feed rollers 19, 20, which impel it forward as the tube is withdrawn, inside out, from its trailing end. During this operation the leading end of the mandrel 21 is engaged by the roller 34, and the latter, with the feed roller 19 as a fulcrum, raises the trailing end of the mandrel clear of the positioning rollers 35, as shown in Fig. 5, so that they do not interfere with the withdrawal of the tube.

Passing from the feed rollers the stripped mandrel is impelled onto the rollers 47 of the mandrel-ejecting device and against the buffer-plate 59, driving the latter rearwardly against the force of the spring 60 to open the valve 54, thereby charging the fluid pressure cylinder 45. The upwardly moving piston of the latter raises the free ends of the levers 50, causing the mandrel to be lifted from the rollers 47 and to roll down the levers 50 onto the delivery chute 48. The rising of the piston concurrently raises the lift rods 39 to deliver an unstripped mandrel from the chute 36 onto the positioning rollers 35.

The adjustable feature of the bracket 13 adapts the apparatus for stripping mandrels of various diameters, and also permits easy removal of a mandrel when the tube thereon has been accidently drawn into the feed rollers 19, 20.

My invention provides for greatly increased facility of operation in stripping of the tubes and disposing of the mandrels, and much time being saved by avoiding the necessity of the operator walking backward substantially twice the length of the tube in stripping each tube from the mandrel and then disposing of the mandrel by hand.

My invention is susceptible to modification within its scope and I do not wholly limit my claims to the specific construction shown or the exact procedure described.

I claim:

1. The method of stripping tubes from mandrels which comprises laterally moving successive mandrels in procession to a stripping position, impelling each mandrel longitudinally from stripping position while removing the tube therefrom, and disposing of the mandrels by moving them laterally in succession as they are delivered from the stripping position.

2. Apparatus for stripping a tube from a mandrel, said apparatus comprising rollers adapted yieldingly and frictionally to engage the mandrel between them to impel it longitudinally, and means for driving said rollers.

3. Apparatus for stripping a tube from a mandrel, said apparatus comprising a pair of driven feed rollers for impelling the mandrel longitudinally, and third roller associated therewith and so positioned as to coact with one of said feed rollers to maintain said mandrel substantially in horizontal position without contact with the tube thereon while the mandrel is fed from the tube by said feed rollers.

4. Tube-stripping apparatus comprising the combination of means for delivering a tube-mandrel to stripping position, means for impelling it longitudinally therefrom while it is stripped, and means for ejecting the stripped mandrel from the apparatus.

5. Tube-stripping apparatus comprising the combination of means for delivering a tube-mandrel to stripping position, means for impelling it longitudinally therefrom while it is stripped, means for ejecting the stripped mandrel from the apparatus, and means for concurrently actuating said delivering and ejecting means.

6. Tube-stripping apparatus comprising the combination of means for delivering successive tube-mandrels to stripping position, means for impelling each of the same longitudinally while the tube is removed therefrom, means for ejecting the stripped mandrel from the apparatus, and contact means adapted to be actuated by the longitudinal movement of the mandrel for concurrently actuating said delivering and ejecting means.

7. Tube-stripping apparatus comprising means for supporting a tube-mandrel in position for the initiation of the stripping operation and roller means adjacent thereto adapted, upon the insertion of one end of the mandrel thereinto, to support the mandrel freely above said supporting means and to feed the mandrel therefrom.

8. Tube-stripping apparatus comprising means for propelling the tube mandrels while they are being stripped, means onto which the mandrels are propelled to stop the same and off-bearing mechanism for removing the mandrels from the second means.

9. Tube-stripping apparatus comprising means for propelling the tube mandrels in succession while they are being stripped, means for receiving the mandrels in succession from the first means, and means for removing the mandrels in succession from the second means.

10. Apparatus for stripping rubber tubes from straight mandrels comprising cooperating, mandrel-driving rollers, means for feeding mandrels into alignment with the rollers, and means for driving the rollers to longitudinally drive the mandrels while they are being stripped.

11. Apparatus for stripping inner tubes from straight mandrels comprising means for longitudinally driving the mandrels while they are being stripped, and means for feeding the mandrels laterally into longitudinal alignment with said driving means.

12. That method of stripping rubber tubes from mandrels which comprises laterally moving the mandrels in succession to a stripping station, and driving the mandrels longitudinally in succession from the stripping station while stripping the tubes therefrom.

13. A device for stripping rubber tubes from mandrels which comprises gripping rollers for engaging a mandrel therebetween to project the mandrel longitudinally, and means for driving said gripping rollers.

14. A device for stripping rubber tubes from mandrels, comprising opposed mandrel gripping and driving rollers, cooperating with the mandrel entirely to support the same horizontally while driven between said rollers.

15. A device for stripping rubber tubes from mandrels, said device including means for feeding mandrels to a stripping station, means for longitudinally driving the mandrel while it is being stripped, and means for ejecting the mandrel from the device after it has been stripped.

16. That method for stripping tubes from mandrels which comprises supporting and driving the mandrel longitudinally by means engaging first with one end thereof and reversely stripping the mandrel relatively toward its other end before it passes into said means.

In witness whereof I have hereunto set my hand this 26th day of June, 1925.

CHARLES W. LEGUILLON.